(No Model.)
W. F. C. M. McCARTY.
PROCESS OF AND APPARATUS FOR DECOMPOSING AND TRANSFORMING FATTY SUBSTANCES INTO FATTY ACIDS AND GLYCERINE.
No. 282,547. Patented Aug. 7, 1883.
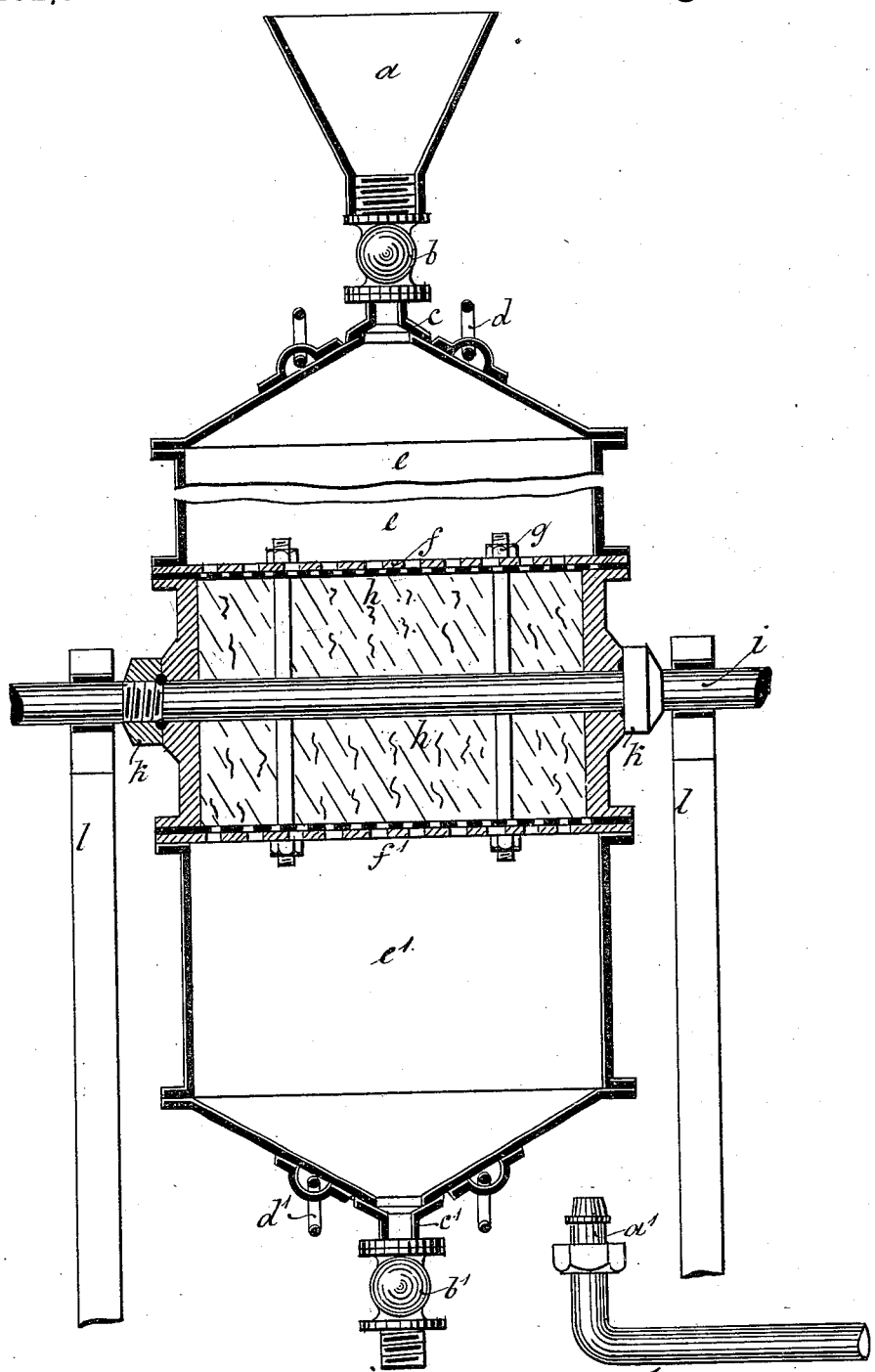

UNITED STATES PATENT OFFICE.

WILLIAM F. C. M. McCARTY, OF BERLIN, GERMANY.

PROCESS OF AND APPARATUS FOR DECOMPOSING AND TRANSFORMING FATTY SUBSTANCES INTO FATTY ACIDS AND GLYCERINE.

SPECIFICATION forming part of Letters Patent No. 282,547, dated August 7, 1883.

Application filed May 22, 1883. (No model.)

*To all whom it may concern:*

Be it known that I, WILLIAM FITZ-CHARLES MASON McCARTY, a citizen of the United States of North America, residing at the city of Berlin, in the German Empire, have invented certain new and useful Improvements in the Process of and Apparatus for Decomposing and Transforming Fatty Substances into Fatty Acids and Glycerine, of which the following is a specification.

My said invention relates to improvements in the process of decomposing and transforming fats or fatty substances into fatty acids and glycerine. Having transformed the grease and fats into fatty acids, as described in a former patent application made by me, some of the glycerine still remains suspended mechanically in the same, and is separated by employing a vacuum as follows: After the fatty acids have been freed as far as possible from glycerine by the first application of the vacuum the same are washed or rinsed with a fresh quantity of water, a vacuum again produced, and the fatty acids allowed to remain for a short time under this vacuum, when they separate according to their specific gravity. This operation is repeated until the entire glycerine is eliminated from the said fatty acids. The glycerated water is now heated, and the water evaporated until the same shows 18° to 20° Baumé, after which the said glycerated water is mixed with a small quantity of animal-charcoal or other suitable filtering and decoloring matter and agitated for some time and allowed to settle until the charcoal separates out by its own specific gravity, carrying with it the greater portion of the coloring or other foreign matter that may have been suspended in the said glycerine-water. The waters are now taken and passed through a filter specially prepared for this purpose, which said filter works under vacuum-pressure, by means of which constant and regular pressure the liquids are filtered quickly and received into the vacuum-chamber beneath, as shown in the accompanying drawing. By this process I can filter oils and other heavy viscid substances, depriving them of their coloring-matter and other impurities held in suspension. The glycerine-water, showing 18° to 20° Baumé, so won and filtered, is now placed in a suitable exhauster, which said exhauster I heat up to a temperature not exceeding 50° centigrade, when a continuous vacuum is produced and the water exhausted into a suitable receiver, where it is condensed, leaving the glycerine in an absolutely pure anhydrous state. As the said glycerine has not been contaminated by any chemical or mineral substance it remains perfectly colorless and weighs 30° Baumé.

It will be seen by the above process that I first take the glycerated waters received from the fatty acids and condense the same to a specific gravity at which they can be most readily filtered from all impurities and decolored, after which they are again introduced into the receiver or digester and the water exhausted under the employment of a continuous vacuum and at low temperature until the same show 30° Baumé, when the glycerine is anhydrous and remains in a perfectly colorless and pure state. By this process I exhaust the water very rapidly at an unusually low temperature, thus preventing any burning or overheating of the glycerine, as in other processes. No chemicals are employed. I do not resort to distillation, and recover all the glycerine contained in the waters, thus having absolutely no loss. My process is, furthermore, more economical as to time of working than any other known process, and by it a great saving of fuel is attained.

In the accompanying drawing the figure is a vertical section of my improved filter. The same is mounted in suitable standards, and is provided with suitable filtering material—for instance, a mixture of charcoal and silicate or slag-wool. My said filter is so arranged that the same can be readily cleansed, for which purpose the said filter can be reversed and all impurities in the filtering mass readily driven out. If the mass is so filled with impurities that the same ceases to filter correctly, the apparatus is reversed and a stream of water, either hot or cold, or jets of steam, introduced into the upper filter space or chamber, $e$ or $e'$, which passes through the filtering material and drives out all impurities, whereupon the filter can be again connected with the vacuum apparatus and the process of filtering continued.

The hopper $a$ serves to feed the filter, which is screwed onto the neck $c$ of the said filter immediately above the cock or valve $b$, which is rigidly attached to the lid of the filter. The upper space or chamber, $e$, as shown in the accompanying drawing, is connected by means of rivets, bolts, or other attachment to the filter proper, $h$, which is separated from the said space $e$ by a perforated diaphragm, $f$, to the under or inner surface of which a suitable sieve can be be attached. The said filter proper is either provided with suitable trunnions and gearing, or the axle $i$ can run through the entire filter and be carried in the bearings $l$. The nuts $k$ serve to prevent all leakage. The lower part of the filter is provided in like manner, as afore described, with a sieve of suitable fineness and a perforated diaphragm, $f'$, which is attached to the diaphragm $f$ by means of suitable bolts and nuts, $g$. The lower part of the filter consists of exactly the same parts as the upper part—i. e., the chamber or space $e'$, neck $c'$, and cock or valve $b'$. Rings or loops $d\ d'$ are attached to the lid or lids or bottom of the said filter, so that in case repairs are necessary the lid can be held at any desired height by means of pulley-blocks and chains or ropes, which said chains or ropes can also be employed to prevent any too sudden revolution or turning of the filter when the same is to be reversed.

The threads to the cock or valve pipe or pipes are exactly alike at each end, so that the same neck can be attached to the hopper $a$ or the pipe $a'$, which leads to the vacuum apparatus.

I wish it to be specially understood that my process of filtering glycerine and other viscid matters is carried on under the employment of a continuous vacuum. The advantages of my said filter for such purposes will be evident to any expert in this branch of trade.

Having now described my said invention for improvements in the process of decomposing and transforming fatty substances into fatty acids and glycerine and the manner in which the same is to or may be carried into effect, I wish it to be understood that what I claim, and desire to secure by Letters Patent, is—

1. In the process of decomposing and transforming fatty substances into fatty acids and glycerine, condensing, filtering, and decolorizing the glycerated waters, and then exhausting the water under a continuous vacuum until a temperature of about 30° Baumé is reached, substantially as described.

2. A reversible filter for use in decomposing and transforming fatty substances into fatty acids and glycerine under vacuum, the same consisting of convertible induction and eduction chambers, an intermediate filtering and decolorizing agent, a foraminous inclosure for said agent, and air-tight journals, constructed and arranged to operate substantially as shown and described.

WILLIAM FITZ-CHARLES MASON McCARTY.

Witnesses:
EDWIN A. BRYDGES,
ANTHONY STEFFEN.

It is hereby certified that in Letters Patent No. 282,547, granted August 7, 1883, to William F. C. M. McCarty, of Berlin, Germany, for an improvement in the "Process of and Apparatus for Decomposing and Transforming Fatty Substances into Fatty Acids and Glycerine," an error appears requiring correction as follows: in line 51, page 2, of the printed specification, the word "temperature" should have been omitted, and the words *specific gravity* inserted, and that the specification should be read with this correction therein to make it conform with the records of the case in the Patent Office.

Signed, countersigned, and sealed this 11th day of September, A. D. 1883.

[SEAL.]

M. L. JOSLYN,
*Acting Secretary of the Interior.*

Countersigned:
 E. M. MARBLE,
  *Commissioner of Patents.*